United States Patent [19]
Chen et al.

[11] Patent Number: 5,856,018
[45] Date of Patent: Jan. 5, 1999

[54] PLASTIC ARTICLES HAVING MULTI-LAYER ANTIREFLECTION COATINGS, AND SOL-GEL PROCESS FOR DEPOSITING SUCH COATINGS

[75] Inventors: Din-Guo Chen, Agoura; Yongan Yan, Thousand Oaks; Satyabrata Raychaudhuri; Yoshitake Sato, both of Agoura; Arnab Sarkar, West Hills, all of Calif.

[73] Assignee: Yazaki Corporation, Tokyo, Japan

[21] Appl. No.: 664,911

[22] Filed: Jun. 17, 1996

Related U.S. Application Data

[63] Continuation of Ser. No. 618,915, Mar. 20, 1996, abandoned.

[51] Int. Cl.[6] ............................................. B32B 9/04
[52] U.S. Cl. ...................... 428/448; 428/412; 428/446; 428/480; 428/500; 427/162; 427/372.2; 427/380
[58] Field of Search .................... 428/412, 446, 428/448, 480, 500; 427/162, 372.2, 380

[56] References Cited

U.S. PATENT DOCUMENTS 4,725,109   2/1988   Wank et al. ........................... 350/1.6

*Primary Examiner*—Helen L. Pezzuto
*Attorney, Agent, or Firm*—James R. Brueggemann; Sheppard, Mullin, Richter & Hampton LLP

[57] ABSTRACT

A sol-gel process is disclosed for depositing multi-layer antireflection coatings on plastic substrates. One or more polymerized, titanium-containing solutions are provided by mixing a titanium alkoxide, an alcohol, and water, and one or more polymerized, silicon-containing solutions are provided by mixing a silicon alkoxide, an alcohol, and water. These solutions are applied to the plastic substrate in an alternating fashion, to produce a succession of uniform layers of polymerized titanium dioxide and polymerized silicon dioxide. Each layer is individually cured before the next layer is applied. The resulting coating of multiple polymerized layers provides very low reflectance over the entire visible wavelength range, yet with excellent mechanical strength and durability.

48 Claims, 1 Drawing Sheet

PLASTIC ARTICLES HAVING MULTI-LAYER ANTIREFLECTION COATINGS, AND SOL-GEL PROCESS FOR DEPOSITING SUCH COATINGS

This application is a continuation of application Ser. No. 08/618,915 filed Mar. 20, 1996 now abandoned.

BACKGROUND OF THE INVENTION

This invention relates generally to antireflection coatings on plastic substrates and, more particularly, to sol-gel processes that deposit multi-layer antireflection coatings of silicon dioxide and titanium dioxide.

Antireflection coatings for plastic substrates reduce the reflectance of visible light from the substrates and enhance the transmission of such light into, or through, the substrates. When the substrates are used as cover plates for display instruments, these coatings enhance the brightness, contrast and readability of the displayed information, for a variety of lighting conditions.

Some antireflection coatings of this kind have included multi-layer stacks having alternate layers of titanium dioxide and silicon dioxide. The titanium dioxide layers generally have a relatively high refractive index, and the silicon dioxide layers generally have a relatively low refractive index, typically lower than even that of the underlying plastic substrate. Each layer of the multi-layer stack has a prescribed thickness, and reflections from multiple layers interfere destructively to result in reduced reflectivity over the entire visible spectrum of 400 to 700 nanometers.

Although various antireflection coatings, including the multi-layer coatings described briefly above, have been generally effective in providing reduced reflectivity over the visible spectrum, the coatings are not considered to be entirely satisfactory for use in many applications. For example, some of the processes provide coatings that are highly susceptible to mechanical damage from abrasion and that exhibit poor adhesion to the underlying substrate.

Moreover, processes for depositing such coatings, including electron beam deposition, reactive plasma sputtering, and ion-assisted deposition, are relatively expensive to implement and are not readily usable for coating substrates having many sizes and configurations. In addition, some substrates can be damaged by such processes, because of excessive heat generation. Substrates formed of polymethyl methacrylate (PMMA), polystyrene, polycarbonate, allyl diglycol carbonate (CR-39), and polyethylene terephthalate (PET) are considered to be particularly susceptible to such heat damage. Some deposition processes have eliminated the occurrence of heat damage, but they are believed to be suitable for use only with substrates of limited sizes and shapes, such as eyewear lenses.

It should, therefore, be appreciated that there is a need for an improved multi-layer antireflection coating and process for depositing such coatings on plastic substrates in a variety of sizes and configurations, with reduced expense and with reduced susceptibility to mechanical, environmental and heat damage. The present invention fulfills this need.

SUMMARY OF THE INVENTION

The present invention resides in a multi-layer antireflection coating, and a process for depositing such coatings on a plastic substrate, the coating having high mechanical strength and durability. The process includes preliminary steps of mixing together an alkoxide, an alcohol, and water to produce one or more first polymerized solutions and to produce one or more second polymerized solutions, wherein the first solutions are formulated to provide thin films having a refractive index of 1.80 or more and the second solutions are formulated to provide thin films having a refractive index of 1.46 or less. A first polymerized solution and a second polymerized solution are applied to a plastic substrate in an alternating fashion, each such application causing a prescribed amount of the solution to adhere to the substrate. Following the each step of applying, the adhered solution is cured, to form a separate, polymerized layer on the substrate. The successive polymerized layers cooperate to form a multi-layer coating of at least four layers that provides substantially reduced reflectively of visible light.

The one or more first solutions preferably are produced by mixing a titanium alkoxide such as titanium isopropoxide, titanium propoxide, or titanium ethoxide with ethyl alcohol, deionized water, and an acidic catalyst such as hydrochloric acid or nitric acid, in prescribed relative proportions. The one or more second solutions preferably are produced by mixing a silicon alkoxide such as tetraethyl orthosilicate or tetramethyl orthosilicate, ethyl alcohol, deionized water, and an acidic catalyst such as hydrochloric acid or nitric acid, in prescribed relative proportions. When cured, the solutions produce polymerized, solid layers of titanium dioxide and silicon dioxide. The titanium dioxide layers have an index of refraction in the range of 1.80 to 2.20, and the silicon dioxide layers have a refractive index in the range of 1.40 to 1.46. In the case of a four-layer coating, the first layer preferably is titanium dioxide, with a uniform thickness in the range of 10 to 30 nanometers (nm), the second layer is silicon dioxide, with a uniform thickness in the range of 20 to 40 nm, the third layer is titanium dioxide, with a uniform thickness in the range of 70 to 100 nm, and the fourth layer is silicon dioxide, with a uniform thickness in the range of 80 to 110 nm.

The first and second solutions are each mixed for at least four hours, during which time the solutions undergo hydrolysis reactions and polymerization. Before application to the substrate, the solutions are filtered through a filter having openings no larger than 5 microns in size.

The step of applying the coating occurs within a chamber in which the humidity is carefully controlled. When a titanium dioxide layer is being applied, the humidity preferably is maintained above 40%, while when a silicon dioxide layer is being applied, the humidity is maintained below 40%. All four layers are cured at an elevated temperature (e.g., 84° C. for some grades of polymethyl methacrylate) for at least 10 minutes each. To avoid thermal shock, the temperature is controllably raised to the cure temperature at a rate not exceeding 15° C. per minute and, after curing, lowered back to room temperature at a similar rate.

In some cases, a thin base coat is applied to the plastic substrate, before the layers of the antireflection coating. This base coat minimizes the visibility of any fine scratches in the substrate's surface.

The coated plastic substrate produced by the process of the invention exhibits an average reflectance of less than 0.2% over the wavelength range of of 450 to 650 nm and less than 0.9% over the entire visible spectrum of 400 to 700 nm. The coating exhibits excellent abrasion resistance and adhesion to the underlying substrate. In addition, the coating can withstand severe environmental conditions without noticeable degradation of its optical and mechanical properties. Suitable substrate materials include polymethyl methacrylate, polystyrene, polycarbonate, allyl diglycol carbonate, and polyethylene terephthalate.

Other features and advantages of the present invention should become apparent from the following description of the preferred process, taken in conjunction with the accompanying drawings, which illustrate, by way of example, the principles of the invention.

DESCRIPTION OF THE PREFERRED EMBODIMENT AND PROCESS

Figure 1:
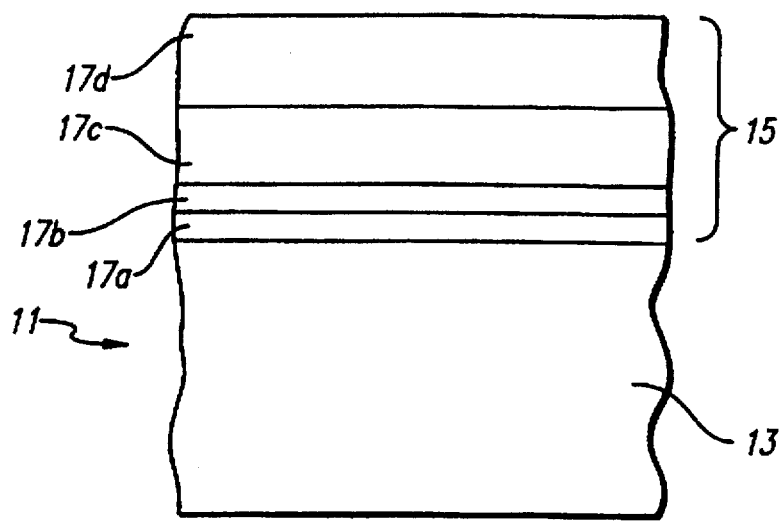
FIG. 1 is a cross-sectional view, not to scale, of a transparent plastic substrate on which has been deposited a four-layer antireflection coating using the preferred process of the invention.

With reference now to the drawings, and particularly to FIG. 1, there is shown a panel 11 that includes a plastic substrate 13 on which is deposited a four-layer antireflection coating 15, for providing low reflectivity over the entire visible spectrum of 400 to 700 nanometers (nm). The antireflection coating includes alternating layers of polymerized titanium dioxide and polymerized silicon dioxide, which are deposited successively using a sol-gel process by which each layer's thickness and index of refraction can be carefully controlled. The first layer 17a and third layer 17c of the coating are formed of titanium dioxide, and the second layer 17b and fourth layer 17d of the coating are formed of silicon dioxide. The substrate 13 can be formed of any conventional plastic material such as polymethyl methacrylate (PMMA), polystyrene, polycarbonate, allyl diglycol carbonate (CR-39), or polyethylene terephthalate (PET).

In a preliminary step of the process, the plastic substrate 13 is cleaned. Plastic substrates in the form of flat sheets usually are supplied by manufacturers with an adhesive paper on both surfaces, to minimize damage from handling. This adhesive paper is first peeled off, and the bare sheet is then cleaned in an ultrasonic bath with detergent solutions and rinsed with deionized water. The cleaned sheet is then dried under a hot air flow, followed by an ionized air flow, to avoid a static charge buildup on the surface. The plastic sheets used in the examples set forth below were rectangular and flat, with dimensions of 15 cm×40 cm×2 mm. However, the process disclosed can readily be used for sheets having either smaller or larger sizes, and for complicated shapes having curvatures and bends.

The antireflection coating 15 sometimes can make fine scratches in the surface of the substrate 13 unduly visible. It is therefore sometimes desirable to apply a thin, silicon- or acrylic-based base coat to the substrate surface. The base coat preferably has an index of refraction comparable to that of the underlying plastic substrate, and it is applied, e.g., by dip coating, in a thickness of about 1 to 5 microns. A suitable UV-curable coating material is UVB510R6, available from Red Spot Paint & Varnish Co., Inc., of Evansville, Ind. A suitable thermally cured material is Silvue 201, available from SDC Coatings Inc., of Anaheim, Calif.

The coating solutions for depositing the titanium dioxide layers, i.e., the first layer 17a and the third layer 17c, are prepared by mixing titanium isopropoxide ($Ti(OiPr)_4$), ethyl alcohol (EtOH), deionized water ($H_2O$), and hydrochloric acid (HCl). The general range of the molar composition considered to be suitable for the first layer is 1 mole of $Ti(OiPr)_4$, 80 to 120 moles of EtOH, 2 to 5 moles of $H_2O$, and 0.05 to 0.5 mole of HCl. The general range of the molar composition considered to be suitable for the third layer is 1 mole of $Ti(OiPr)_4$, 35 to 55 moles of EtOH, 2 to 5 moles of $H_2O$, and 0.1 to 0.4 mole of HCl. Other titanium alkoxides, e.g., titanium propoxide and titanium ethoxide, can be substituted for titanium isopropoxide. In addition, nitric acid ($HNO_3$) can be substituted for hydrochloric acid. The mole ratio between titanium isopropoxide and ethyl alcohol was found to be important in maintaining the stability of the solution for 90 days or more, for continuous use.

The four components of the titanium dioxide solutions are mixed at room temperature for at least four hours, during which time the solutions undergo hydrolysis and polymerization. The polymerized solutions then are filtered and transferred to suitable coating tanks. The coating tanks preferably are made of polypropylene, and they are thoroughly cleaned before receiving the solutions.

The coating solutions for depositing the silicon dioxide layers, i.e., the second layer 17b and the fourth layer 17d, are prepared by mixing tetraethyl orthosilicate (TEOS), ethyl alcohol (EtOH), deionized water ($H_2O$), and hydrochloric acid (HCl). The general range of the molar composition considered to be suitable for the second layer is 1 mole of TEOS, 70 to 110 moles of EtOH, 2 to 6 moles of $H_2O$, and 0.1 to 0.3 mole of HCl. The general range of suitable molar composition considered to be suitable for the fourth layer is 1 mole of TEOS, 20 to 40 moles of EtOH, 2 to 5 moles of deionized $H_2O$, and 0.05 to 0.1 mole of HCl. Other silicon alkoxides, such as tetramethyl orthosilicate, can be substituted for tetraethyl orthosilicate, and nitric acid ($HNO_3$) can be substituted for hydrochloric acid. The mole ratio between tetraethyl orthosilicate and ethyl alcohol was found to be important in maintaining the stability of the solution for 30 days or more, for repetitive coatings.

The four components of the silicon dioxide solutions are mixed for at least four hours, all at room temperature, during which time the solutions undergo hydrolysis and polymerization. The solutions then are filtered and transferred to suitable polypropylene coating tanks.

The prepared titanium dioxide and silicon dioxide solutions are deposited as individual layers on the plastic substrate 13 by any of a number of suitable techniques, but preferably by dip coating. In the dip coating technique, the substrate is clamped to a cantilevered arm, and a drive system moves the arm and substrate down and up along a vertical axis. The range of motion must be sufficient to dip the substrate fully into, and out of, a dip tank that carries the solution.

Each successive layer of the multi-layer antireflection coating 15 is deposited on the substrate 13 by lowering the cantilevered arm and substrate at a predetermined speed into the dip tank carrying the solution. After remaining submerged for a brief time period, the substrate is withdrawn from the solution at a predetermined speed. The drive system includes a suitably programmed computer, for precisely controlling the withdrawal speed of the arm and substrate, so as to control the thickness of the layer being deposited. In general, slower withdrawal speeds yield thinner coating layers.

The dip tank and cantilevered arm are enclosed within a dip coating chamber having a controlled humidity. It has been found that the humidity within the chamber must be precisely controlled, to ensure the depositing of transparent, defect-free coating layers. For depositing titanium dioxide layers (e.g., the layers 17a and 17c), the relative humidity within the chamber is controlled to be in the range of 40 to 80%. A lower humidity can cause the deposited layer to be translucent or even opaque, and a higher humidity can cause the deposited layer to include spot defects. For depositing silicon dioxide layers (e.g., the layers 17b and 17d), on the other hand, the relative humidity within the chamber is controlled to be in the range of 20 to 40%. A higher humidity can cause spot defects in the deposited layer.

Maintaining the humidity within the dip coating chamber at a value within the prescribed range yields clear, defect-free coating layers on the specified plastic substrate 13. The temperature within the chamber preferably is maintained in the range of 19° to 25° C.

Following the depositing of each coating layer, the panel 11 is transferred to an oven, for curing. Curing evaporates residual organics from the uppermost layer, to yield a solid film with some residual porosity. The temperature of the oven is controlled according to the type of substrate 13 used, and it preferably is selected to be the maximum temperature that the particular substrate can withstand without deformation. For PMMA, the cure temperature is maintained at 84° C.

The duration of the cure for each coating layer affects the strength of the resulting multi-layer stack 15. In the preferred process, the cure duration for each of the layers 17a, 17b, 17c and 17d is at least 10 minutes. Shorter cure durations for any one of the four layers can weaken the mechanical properties of the entire multi-layer coating 15, including either or both of its scratch resistance and adhesion.

To avoid a thermal shock to the coated substrate 13 when it is first placed into the curing oven, the oven's temperature is initially maintained at about 23° C. and then raised at a controlled, uniform rate to its final 84° C. temperature. This temperature rise preferably occurs at a rate not exceeding 15° C. per minute. After maintenance at this 84° C. temperature for the specified cure duration, e.g., 10 minutes, the oven temperature is cooled to 23° C., again at a controlled, uniform rate of 15° C. per minute or less. A failure to avoid a thermal shock can lead to the formation of cracks in the deposited layer.

Following the curing of the fourth layer 17d of the antireflection coating 15, the panel 11 is subjected to several tests. One test is made using a spectrophotometer, to ascertain the coated substrate's reflectance over the visible wavelength range of 400 to 700 nm. Other tests ascertain the coating's mechanical strength, including a pencil scratch test and a tape adhesion test.

In the pencil scratch test, standard lead pencils having ratings of HB, H, 2H, 3H, etc. are each sharpened to a fine lead tip and dragged several millimeters along the surface of the antireflection coating 15, while under a 1000 gram compressive load. The coating then is inspected for the presence of any visual scratch marks, under standard room lighting conditions.

In the tape adhesion test, a strip of 3M-brand transparent tape is firmly pressed against the antireflection coating 15 and then removed vertically with a quick upward pull. The coating surface then is inspected for uniformity.

The susceptibility of the coated substrate 13 to environmental degradation also is tested. These tests include: 1) a high temperature test, 2) a low temperature test, 3) a humidity test, 4) a thermal shock test, and 5) a chemical resistance test.

In the high temperature test, the panel 11 is exposed to 84° C. for 192 hours, after which it is inspected for any degradation in its reflectance, scratch resistance, adhesion properties, and visual appearance. In the low temperature test, the coated substrate is exposed to –40° C. for 192 hours, after which these same parameters are checked. In the humidity test, the coated substrate is exposed to 95% relative humidity at 60° C., for 192 hours, and the same parameters are then checked. In the thermal shock test, the coated substrate is cycled 200 times between 84° C. and –30° C., and the same parameters are then checked. Finally, in the chemical resistance test, a detergent, a polishing wax, brake oil, and a household glass cleaner are applied to the coating 15, and the panel 11 is exposed to 60° C. for 24 hours, after which the same parameters are checked.

The preferred process of the invention having been generally described, the following particular examples will illustrate various properties of the invention and demonstrate the practical advantages of the invention. These examples should be construed merely as illustrative, and should not limit the remainder of the disclosure or the claims.

EXAMPLE 1

This example produced a four-layer antireflection coating on a (PMMA) substrate having a length of 40 cm, a width of 15 cm, and a thickness of 2 mm. Adhesive paper was first removed from the PMMA sheet, and the bare sheet was then cleaned in an ultrasonic bath with detergent solutions and thoroughly rinsed with deionized water. The sheet was then dried under a hot air flow, followed by an ionized air flow, to avoid static charge buildup.

Separate coating solutions were prepared for each of the coating's four layers. The solutions for the first and third layers were titanium based, while the solutions for the second and fourth layers were silicon based.

The solution for the first layer was prepared by mixing titanium isopropoxide (Ti(OiPr)$_4$), ethyl alcohol (EtOH), deionized water (H$_2$O), and hydrochloric acid (HCl). The composition for this first layer was Ti(OiPr)$_4$:EtOH:H$_2$O:HCl=1:108:3:0.2. These four components were mixed thoroughly at room temperature for four hours, after which the solution was allowed to stand at room temperature for 48 hours. During this time the solution underwent an hydrolysis reaction and polymerization, to form a titanium dioxide polymer solution. The polymerized solution then was filtered and transferred to a polypropylene storage tank.

The solution for the first layer was transferred to a dip coating chamber, and the PMMA substrate was clamped to a vertically movable arm. The temperature within the chamber was controlled to be 23° C., and the humidity within the chamber was controlled to be in the range of 40 to 80%. The substrate then was lowered into the solution and kept submerged for 10 seconds, after which it was withdrawn at a speed of 0.2 cm per second. As the substrate was withdrawn, a clear, uniform layer was obtained.

The substrate coated with the first layer then was transferred to an oven, and the temperature of the oven was raised at a uniform rate 2° C. per minute, from 23° C. to 84° C. This 84° C. temperature was maintained for ten minutes, during which time the first coating layer was fully cured. The oven temperature then was lowered back to 23° C., again at a uniform rate of 2° C. per minute, and the substrate was removed. The thickness of the cured titanium dioxide first layer was measured in the range of 15 to 25 nm, and the layer's refractive index was measured to be 2.00 at a wavelength of 550 nm.

The coating solution for the second layer was prepared by mixing tetraethyl orthosilicate (TEOS), ethyl alcohol (EtOH), deionized water ($H_2O$), and hydrochloric acid (HCl). The composition for this second layer was TEOS:EtOH:$H_2O$:HCl=1:80:3:0.2. These four components were mixed thoroughly at room temperature for four hours, after which the solution was allowed to stand at room temperature for another four hours. During this time the solution underwent an hydrolysis reaction and polymerization, to form a silicon dioxide polymer solution. The polymerized solution then was filtered and transferred to a polypropylene storage tank.

The solution for the second layer was transferred to the dip coating chamber, and the PMMA substrate, with the first layer of the four-layer antireflection coating already adhered, was clamped to the vertically movable arm. The temperature within the chamber was controlled to be 23° C., and the humidity within the chamber was controlled to be within the range of 20 to 40%. The substrate then was lowered into the solution and kept submerged for 10 seconds, after which it was withdrawn at a speed of 0.12 cm per second. As the substrate was withdrawn, a clear, uniform second layer was obtained on top of the first layer.

The substrate coated with the cured first layer and the newly dipped second layer then was transferred to the curing oven, and the temperature of the oven was raised at a uniform rate of 2° C. per minute, from 23° C. to 84° C. This 84° C. temperature was maintained for ten minutes, during which time the second coating layer was cured. The oven temperature then was lowered back to 23° C., again at a uniform rate of 2° C. per minute, and the substrate was removed. The thickness of the cured silicon dioxide second layer was measured to be in the range of 25 to 35 nm, and the layer's refractive index was measured to be 1.45 at a wavelength of 550 nm.

The coating solution for the third layer was prepared in a manner similar to the solution for the first layer, except with a somewhat different molar composition. The molar composition was TiOiPr:EtOH:$H_2O$:HCl=1:45:3:0.2. During the dipping stage for the third layer, the temperature and humidity were controlled to be the same as for the dipping stage for the first layer, but the substrate was withdrawn from the solution at a speed of 0.25 cm per second. Curing of the third layer occurred in exactly the same way as did curing of the first layer. After curing, the thickness of the third layer was measured to be in the range of 70 to 90 nm, and its refractive index was measured to be 2.00 at a wavelength of 550 nm.

The coating solution for the fourth layer was prepared in a manner similar to the solution for the second layer, except with a somewhat different molar composition. The molar composition was TEOS:EtOH: $H_2O$:HCl=1:27:3.7:0.07. During the dipping stage for the fourth layer, the temperature and humidity were controlled to be the same as for the dipping stage for the second layer, but the substrate was withdrawn from the solution at a speed of 0.2 cm per second. Curing of the fourth layer occurred in exactly the same way as did curing of the second layer. After curing, the thickness of the fourth layer was measured to be in the range of 90 to 110 nm, and its refractive index was measured to be 1.44 at a wavelength of 550 nm.

Figure 2:
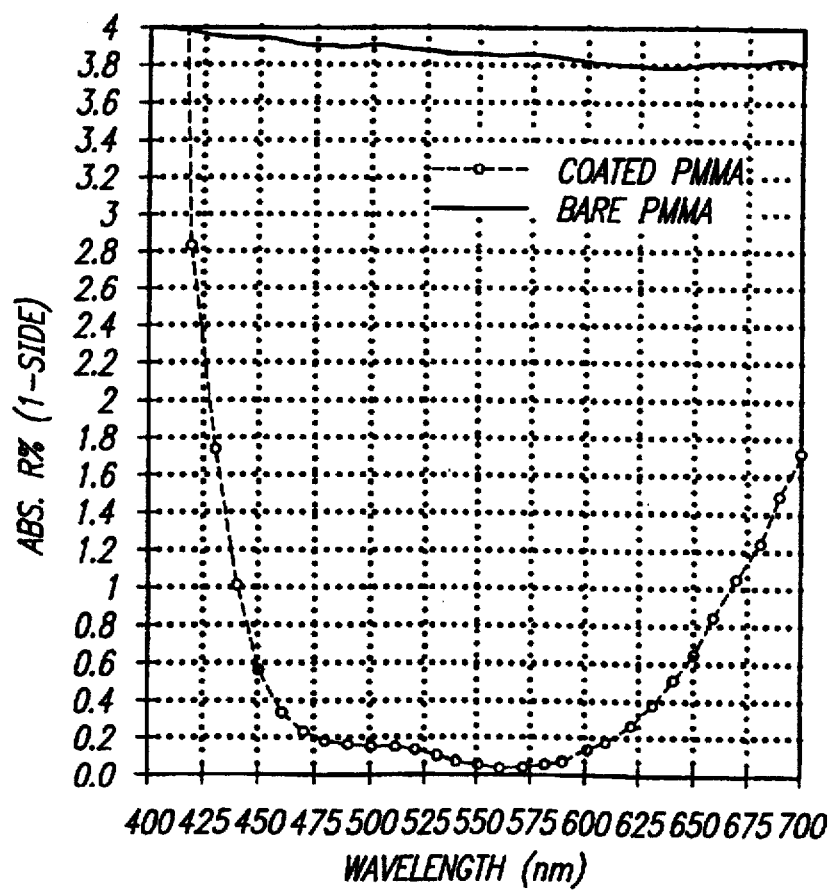
FIG. 2 is a graph of the reflectivity of a polymethyl methacrylate substrate, both with and without a multi-layer antireflection coating deposited in accordance with the preferred process of the invention.

After the final curing step for the fourth layer of the four-layer antireflection coating of this example, the coating was found to be clear and free of any visible defects. The sample's reflectance was measured using a spectrophotometer over a wavelength range of 300 to 800 nm, and data representing the results of this measurement are depicted in FIG. 2. The data show the average reflectance to be less than 0.2% in the wavelength range of 450 to 650 nm and less than 0.9% over the entire visible wavelength range of 400 to 700 nm.

The four-layer antireflection coating of this example also was evaluated using a scratch resistance test and a tape adhesion test. The sample showed no visible marks from even a 3H pencil, and it withstood the tape adhesion without damage.

The four-layer antireflection coating of this example also was evaluated for susceptibility to environmental degradation, by subjecting it to the five environmental conditions or tests identified above. These include a high temperature test, a low temperature test, a humidity test, a thermal shock test, and a chemical resistance test. Following each such environmental test, the sample was evaluated for its reflectance, scratch resistance, and tape adhesion resistance. No degradation in the sample's properties were observed following these environmental tests.

EXAMPLE 2

Four-layer antireflection coatings are deposited on plastic substrates formed of polystyrene, polycarbonate, CR-39, and PET using exactly the same procedure as in Example 1. In each case, very low reflectance similar to that shown in FIG. 2 is observed, and mechanical properties similar to those of the sample of Example 1 are obtained.

EXAMPLE 3

A four-layer antireflection coating was deposited on a PMMA substrate using coating solutions prepared in exactly the same way as set forth in Example 1, except that the solutions were not filtered prior to dip coating. Each of the layers contained spot defects, and the coated panels were unusable.

EXAMPLE 4

A four-layer antireflection coating was deposited on a PMMA substrate using coating solutions prepared in exactly the same way as in Example 1, except that the silicon dioxide solutions for the second and fourth layers were mixed at room temperature for just 30 minutes, not four hours. The resulting four-layer antireflection coatings had reflectances much higher than 0.2% over the 450 to 650 nm range. Moreover, the reflectance values varied substantially for a number of panels that were coated using these same solutions. This indicated that the solutions had not stabilized within the 30-minute mixing period.

EXAMPLE 5

A four-layer antireflection coating was deposited on a PMMA substrate using coating solutions prepared in exactly the same way as in Example 1, except that after mixing, the titanium dioxide solutions for the first and third layers were allowed to mix at room temperature for just 30 minutes, not 4 hours. The resulting four-layer antireflection coatings had reflectances much higher than 0.2% over the 450 to 650 nm range. Moreover, the reflectance values varied substantially for a number of panels that were coated using these same solutions. This indicated that the solutions had not stabilized within the 30-minute period.

EXAMPLE 6

Coated PMMA panels were prepared in exactly the same way as in Example 1, except that the titanium dioxide layers, i.e., the first and third layers, were dip coated in a relative humidity of less than 40%. Both layers became opaque as the coated substrate was removed from the coating solution. The resultant four-layer antireflection coating was not transparent, and it failed both the scratch resistance test and the tape adhesion test.

EXAMPLE 7

Coated PMMA panels were prepared in exactly the same way as in Example 1, except that the silicon dioxide layers, i.e., the second and fourth layers, were dip coated in a relative humidity of greater than 40%. Both layers had multiple spot defects as the coated substrate was removed from the solution. The resultant four-layer antireflection coating included these spot defects, and the panel was unusable.

EXAMPLE 8

Coated PMMA panels were prepared in exactly the same way as in Example 1, except that the four layers were each cured for just one minute, not ten minutes. The resulting four-layer antireflection coating had cracks and failed both the scratch resistance test and the tape adhesion test.

EXAMPLE 9

Coated PMMA panels were prepared in exactly the same way as in Example 1, except that a UV-curable base coat was first applied to the panel surface. A low reflectance comparable to that shown in FIG. 2 was observed, and mechanical properties similar to those of the sample of Example 1 were obtained.

EXAMPLES 10–12

Coated PMMA panels are prepared in exactly the same way as in Example 1, except that the coating composition for the first layer is $Ti(OiPr)_4$:EtOH:$H_2O$:HCl=1:80:2:0.05 (Example 10); $Ti(OiPr)_4$:EtOH $H_2O$:HCl=1:90:3:0.1 (Example 11); and $Ti(OiPr)_4$:EtOH: $H_2O$:HCl=1:120:5:0.5 (Example 12). In each case, very low reflectance similar to that shown in FIG. 2 is observed, and mechanical properties similar to those provided by the coated panel of Example 1 are obtained.

EXAMPLES 13–14

Coated PMMA panels are prepared in exactly the same way as in Example 1, except that the coating composition for the second layer is TEOS:EtOH $H_2O$:HCl=1:70:2:0.1 (Example 13); and TEOS:EtOH:$H_2O$:HCl=1:90:6:0.3 (Example 14). In each case, very low reflectance similar to that shown in FIG. 2 is observed, and mechanical properties similar to those provided by the coated panel of Example 1 are obtained.

EXAMPLES 15–16

Coated PMMA panels are prepared in exactly the same way as in Example 1, except that the coating composition for the third layer is $Ti(OiPr)_4$:EtOH: $H_2O$:HCl=1:35:2:0.1 (Example 15); and $Ti(OiPr)_4$:EtOH:$H_2O$:HCl=1:55:5:0.4 (Example 16). In each case, very low reflectance similar to that shown in FIG. 2 is observed, and mechanical properties similar to those provided by the coated panel of Example 1 are obtained.

EXAMPLES 17–19

Coated PMMA panels are prepared in exactly the same way as in Example 1, except that the coating composition for the fourth layer is TEOS:EtOH:$H_2O$:HCl=1:25:2:0.05 (Example 17); TEOS:EtOH:$H_2O$:HCl=1:30:4:0.09 (Example 18); and TEOS:EtOH:$H_2O$:HCl=1:35:5:0.1 (Example 19). In each case, very low reflectance similar to that shown in FIG. 2 is observed, and mechanical properties similar to those provided by the coated panel of Example 1 are obtained.

It should be appreciated from the foregoing description that the present invention provides an improved process for depositing a multi-layer antireflection coating on a plastic substrate, which provides very low reflectance over the entire visible wavelength range of 400 to 700 nm, yet with excellent mechanical strength and durability. The multi-layer coating includes an alternating stack of polymerized titanium dioxide and polymerized silicon dioxide, which are applied from special polymerized solutions.

Although the invention has been described in detail with reference only to the preferred processes, those skilled in the art will appreciate that various modifications can be made without departing from the invention. Accordingly, the invention is defined only by the following claims.

We claim:

1. A process for depositing a multi-layer antireflection coating on a plastic substrate, comprising the steps of:

providing one or more polymerized, non-organic, titanium-containing solutions consisting essentially of a titanium alkoxide, an alcohol, and water;

providing one or more polymerized, non-organic, silicon-containing solutions consisting essentially of a silicon alkoxide, an alcohol, and water;

applying a titanium-containing solution and applying a silicon-containing solution to the plastic substrate, in an alternating fashion, wherein a prescribed amount of the solution adheres to the substrate following each step of applying; and following each step of applying, curing the adhered solution, before the next successive step of applying occurs, each such step of curing forming a separate, polymerized layer on the substrate, wherein the successive polymerized layers cooperate to form a multi-layer coating of at least four layers that provides substantially reduced reflectivity of visible light.

2. A process as defined in claim 1, wherein:

each layer of the multi-layer coating that is formed from a titanium-containing solution has an index of refraction in the range of 1.80 to 2.20; and each layer of the multi-layer coating that is formed from a silicon-containing solution has an index of refraction in the range of 1.40 to 1.46.

3. A process as defined in claim 1, wherein:

a first layer of the multi-layer coating is formed from a titanium-containing solution and has a uniform thickness in the range of 10 to 30 nanometers;

a second layer of the multi-layer coating is formed from a silicon-containing solution and has a uniform thickness in the range of 20 to 40 nanometers;

a third layer of the multi-layer coating is formed from a titanium-containing solution and has a uniform thickness in the range of 70 to 100 nanometers; and a fourth layer of the multi-layer coating is formed from a silicon-containing solution and has a uniform thickness in the range of 80 to 110 nanometers.

4. A process as defined in claim 3, wherein each step of applying includes a step of dipping the substrate into, and removing the substrate from, a titanium-containing solution or a silicon-containing solution, each successive removal occurring at a controlled rate, such that a prescribed amount of the solution adheres to the substrate.

5. A process as defined in claim 1, wherein each silicon-containing solution is prepared by mixing the following:
   a silicon alkoxide selected from the group consisting of tetraethyl orthosilicate and tetramethyl orthosilicate;
   ethyl alcohol;
   deionized water; and
   an acidic catalyst selected from the group consisting of hydrochloric acid and nitric acid.

6. A process as defined in claim 5, wherein a second layer of the multi-layer coating is formed from a solution that contains 70 to 90 moles of ethyl alcohol, 2 to 6 moles of deionized water, and 0.1 to 0.3 moles of the acidic catalyst for each mole of the silicon alkoxide.

7. A process as defined in claim 5, wherein a fourth layer of the multi-layer coating is formed from a solution that contains 25 to 35 moles of ethyl alcohol, 2 to 5 moles of deionized water, and 0.05 to 0.1 moles of the acidic catalyst for each mole of the silicon alkoxide.

8. A process as defined in claim 1, wherein each titanium-containing solution is prepared by mixing the following:
   a titanium alkoxide selected from the group consisting of titanium isopropoxide, titanium propoxide, and titanium ethoxide;
   ethyl alcohol;
   deionized water; and
   an acidic catalyst selected from the group consisting of hydrochloric acid and nitric acid.

9. A process as defined in claim 8, wherein a first layer of the multi-layer coating is formed from a solution that contains 80 to 120 moles of ethyl alcohol, 2 to 5 moles of deionized water, and 0.05 to 0.5 moles of the acidic catalyst for each mole of the titanium alkoxide.

10. A process as defined in claim 8, wherein a third layer of the multi-layer coating is formed from a solution that contains 35 to 55 moles of ethyl alcohol, 2 to 5 moles of deionized water, and 0.1 to 0.4 moles of the acidic catalyst for each mole of the titanium alkoxide.

11. A process as defined in claim 1, wherein:
   each silicon-containing solution is prepared by mixing the following
      a silicon alkoxide selected from the group consisting of tetraethyl orthosilicate and tetramethyl orthosilicate,
      ethyl alcohol,
      deionized water, and
      an acidic catalyst selected from the group consisting of hydrochloric acid and nitric acid; and
   each titanium-containing solution is prepared by mixing the following
      a titanium alkoxide selected from the group consisting of titanium isopropoxide, titanium propoxide, and titanium ethoxide,
      ethyl alcohol,
      deionized water, and
      an acidic catalyst selected from the group consisting of hydrochloric acid and nitric acid.

12. A process as defined in claim 11, wherein:
   a first layer of the multi-layer coating is formed from a titanium-containing solution that contains 80 to 120 moles of ethyl alcohol, 2 to 5 moles of deionized water, and 0.05 to 0.5 moles of the acidic catalyst for each mole of the titanium alkoxide;
   a second layer of the multi-layer coating is formed from a silicon-containing solution that contains 70 to 90 moles of ethyl alcohol, 2 to 6 moles of deionized water, and 0.1 to 0.3 moles of the acidic catalyst for each mole of the silicon alkoxide;
   a third layer of the multi-layer coating is formed from a titanium-containing solution that contains 35 to 55 moles of ethyl alcohol, 2 to 5 moles of deionized water, and 0.1 to 0.4 moles of the acidic catalyst for each mole of the titanium alkoxide; and
   a fourth layer of the multi-layer coating is formed from a silicon-containing solution that contains 25 to 35 moles of ethyl alcohol, 2 to 5 moles of deionized water, and 0.05 to 0.1 moles of the acidic catalyst for each mole of the silicon alkoxide.

13. A process as defined in claim 1, wherein the steps of providing one or more silicon-containing solutions and one or more titanium-containing solutions include mixing each solution at room temperature for at least four hours before being applied to the substrate.

14. A process as defined in claim 10, wherein the steps of providing one or more silicon-containing solutions and one or more titanium-containing solutions each include a step of filtering each solution through a filter having openings no larger than 5 microns in size.

15. A process as defined in claim 1, wherein the step of applying a titanium-containing solution to the plastic substrate occurs within a coating chamber in which the relative humidity is at least 40%.

16. A process as defined in claim 1, wherein the step of applying a silicon-containing solution to the plastic substrate occurs within a coating chamber in which the relative humidity is less than 40%.

17. A process as defined in claim 1, wherein the steps of curing the first, second, third and fourth layers of the multi-layer coating each occur at an elevated temperature for at least 10 minutes.

18. A process as defined in claim 17, wherein the elevated temperature of the successive steps of curing is less than the deformation temperature of the plastic substrate.

19. A process as defined in claim 18, wherein:
   the plastic substrate is formed of polymethyl methacrylate; and
   the elevated temperature of the successive steps of curing is less than 84° C.

20. A process as defined in claim 18, wherein the successive steps of curing include:
   raising the temperature of the substrate to the elevated temperature at a rate not exceeding 15° C. per minute; and
   reducing the temperature of the substrate from the elevated temperature to room temperature at a rate not exceeding 15° C. per minute.

21. A process as defined in claim 1, wherein the multi-layer coating that is provided after the final step of curing exhibits an average reflectivity of less than or equal to 0.2% over the wavelength range of 450 nanometers to 650 nanometers and exhibits less than or equal to 0.9% over the wavelength range of 400 to 700 nanometers.

22. A process as defined in claim 1, wherein the multi-layer coating that is provided after the final step of curing withstands at least a 1H pencil scratch test without failure.

23. A process as defined in claim 1, wherein the multi-layer coating that is provided after the final step of curing withstands exposure to 95% relative humidity at 60° C. for at least 192 hours, without significant degradation of optical and mechanical properties.

24. A process as defined in claim 1, wherein the multi-layer coating that is provided after the final step of curing withstands exposure to a temperature of 84° C. for 192 hours and exposure to a temperature of −40° C. for 192 hours, without significant degradation of optical and mechanical properties.

25. A process as defined in claim 1, wherein the multi-layer coating that is provided after the final step of curing withstands exposure to a temperature that cycles 200 times between 84° C. and −30° C., without significant degradation of optical and mechanical properties.

26. A process as defined in claim 1, wherein the plastic substrate is formed of a material selected from the group consisting of polymethyl methacrylate, polystyrene, polycarbonate, allyl diglycol carbonate, and polyethylene terephthalate.

27. A process as defined in claim 1, and further including a preliminary step of applying a base coat to the plastic substrate.

28. A process as defined in claim 1, wherein each step of applying includes a step of dipping the substrate into, and removing the substrate from, a titanium-containing solution or a silicon-containing solution, wherein each successive removal occurs at a controlled rate, such that a prescribed amount of the solution adheres to the substrate.

29. A process for depositing a multi-layer antireflection coating on a plastic substrate, comprising the steps of:

mixing one or more first polymerized, non-organic solutions consisting essentially of an alkoxide, an alcohol, and water, wherein the one or more first polymerized solutions are formulated to provide thin films having a refractive index of 1.80 or more;

mixing one or more second polymerized, non-organic solutions consisting essentially of an alkoxide, an alcohol, and water, wherein the one or more second polymerized solutions are formulated to provide thin films having a refractive index of 1.46 or less;

applying a first polymerized solution and a second polymerized solution to the plastic substrate, in an alternating fashion, wherein a prescribed amount of the solution adheres to the substrate following each step of applying; and following each step of applying, curing the adhered solution, before the next successive step of applying occurs, each such step of curing forming a separate, polymerized layer on the substrate, wherein the successive polymerized layers cooperate to form a multi-layer coating of at least four layers that provides substantially reduced reflectivity of visible light.

30. A process as defined in claim 29, wherein:

the alkoxide mixed in the step of mixing to produce the one or more first polymerized solutions is selected from the group consisting of titanium isopropoxide, titanium propoxide, and titanium ethoxide, and the polymerized layers produced from such one or more first solutions include titanium dioxide; and the alkoxide mixed in the step of mixing to produce the one or more second polymerized solutions is selected from the group consisting of tetraethyl orthosilicate and tetramethyl orthosilicate, and the polymerized layers produced from such one or more second solutions include silicon dioxide.

31. A process as defined in claim 30, wherein:

each layer of the multi-layer coating that is formed from a first solution has an index of refraction in the range of 1.80 to 2.20; and each layer of the multi-layer coating that is formed from a second solution has an index of refraction in the range of 1.40 to 1.46.

32. A process as defined in claim 30, wherein:

a first layer of the multi-layer coating is formed from a first solution and has a thickness in the range of 10 to 30 nanometers;

a second layer of the multi-layer coating is formed from a second solution and has a thickness in the range of 20 to 40 nanometers;

a third layer of the multi-layer coating is formed from a first solution and has a thickness in the range of 70 to 100 nanometers; and a fourth layer of the multi-layer coating is formed from a second solution and has a thickness in the range of 80 to 110 nanometers.

33. A process as defined in claim 30, wherein each of the one or more second solutions is prepared by mixing the following:

a silicon alkoxide selected from the group consisting of tetraethyl orthosilicate and tetramethyl orthosilicate;

ethyl alcohol;

deionized water; and an acidic catalyst selected from the group consisting of hydrochloric acid and nitric acid.

34. A process as defined in claim 30, wherein each of the one or more first solutions is prepared by mixing the following:

a titanium alkoxide selected from the group consisting of titanium isopropoxide, titanium propoxide, and titanium ethoxide;

ethyl alcohol;

deionized water; and an acidic catalyst selected from the group consisting of hydrochloric acid and nitric acid.

35. A process as defined in claim 30, wherein:

each silicon-containing solution is prepared by mixing the following a silicon alkoxide selected from the group consisting of tetraethyl orthosilicate and tetramethyl orthosilicate, ethyl alcohol, deionized water, and an acidic catalyst selected from the group consisting of hydrochloric acid and nitric acid; and each titanium-containing solution is prepared by mixing the following a titanium alkoxide selected from the group consisting of titanium isopropoxide, titanium propoxide, and titanium ethoxide, ethyl alcohol, deionized water, and an acidic catalyst selected from the group consisting of hydrochloric acid and nitric acid.

36. A process as defined in claim 35, wherein:

a first layer of the multi-layer coating is formed from a titanium-containing solution that contains 80 to 120 moles of ethyl alcohol, 2 to 5 moles of deionized water, and 0.05 to 0.5 moles of the acidic catalyst for each mole of the titanium alkoxide;

a second layer of the multi-layer coating is formed from a silicon-containing solution that contains 70 to 90 moles of ethyl alcohol, 2 to 6 moles of deionized water, and 0.1 to 0.3 moles of the acidic catalyst for each mole of the silicon alkoxide;

a third layer of the multi-layer coating is formed from a titanium-containing solution that contains 35 to 55 moles of ethyl alcohol, 2 to 5 moles of deionized water, and 0.1 to 0.4 moles of the acidic catalyst for each mole of the titanium alkoxide; and a fourth layer of the multi-layer coating is formed from a silicon-containing solution that contains 25 to 35 moles of ethyl alcohol, 2 to 5 moles of deionized water, and 0.05 to 0.1 moles of the acidic catalyst for each mole of the silicon alkoxide.

37. A process as defined in claim 29, and further including a preliminary step of applying a base coat to the plastic substrate.

38. A process as defined in claim 29, wherein each step of applying includes a step of dipping the substrate into, and removing the substrate from, a first solution or a second solution, wherein each successive removal occurs at a controlled rate, such that a prescribed amount of the solution adheres to the substrate.

39. A process for depositing a multi-layer antireflection coating on a plastic substrate, comprising the steps of:

providing a first polymerized, non-organic, titanium-containing solution consisting essentially of the following ingredients, in the indicated proportions
1.0 moles of a titanium alkoxide selected from the group consisting of titanium isopropoxide, titanium propoxide, and titanium ethoxide
80 to 120 moles of ethyl alcohol,
2 to 5 moles of deionized water, and
0.05 to 0.05 moles of an acidic catalyst selected from the group consisting of hydrochloric acid and nitric acid;

providing a second polymerized, non-organic, titanium-containing solution consisting essentially of the following ingredients, in the indicated proportions
1.0 moles of a titanium alkoxide selected from the group consisting of titanium isopropoxide, titanium propoxide, and titanium ethoxide
35 to 55 moles of ethyl alcohol,
2 to 5 moles of deionized water, and
0.1 to 0.4 moles of an acidic catalyst selected from the group consisting of hydrochloric acid and nitric acid;

providing a first polymerized, non-organic, silicon-containing solution consisting essentially of the following ingredients, in the indicated proportions
1.0 moles of a silicon alkoxide selected from the group consisting of tetraethyl orthosilicate and tetramethyl orthosilicate,
70 to 90 moles of ethyl alcohol,
2 to 6 moles of deionized water, and
0.1 to 0.3 moles of an acidic catalyst selected from the group consisting of hydrochloric acid and nitric acid;

providing a second polymerized, non-organic, silicon-containing solution consisting essentially of the following ingredients, in the indicated proportions
1.0 moles of a silicon alkoxide selected from the group consisting of tetraethyl orthosilicate and tetramethyl orthosilicate,
25 to 35 moles of ethyl alcohol,
2 to 5 moles of deionized water, and
0.05 to 0.1 moles of an acidic catalyst selected from the group consisting of hydrochloric acid and nitric acid;

applying the first polymerized, titanium-containing solution to a substrate formed of a material methacrylate, polystyrene, polycarbonate, allyl diglycol carbonate, and polyethylene terephthalate, wherein a prescribed amount of the solution adheres to the substrate;

curing the adhered solution to form a first polymerized layer, the layer including polymerized titanium dioxide and having a prescribed uniform thickness and an index of refraction in the range of 1.80 to 2.20;

applying the first polymerized, silicon-containing solution to the coated substrate, wherein a prescribed amount of the solution adheres to the coated substrate;

curing the adhered solution to form a second polymerized layer, the layer including polymerized silicon dioxide and having a prescribed uniform thickness and an index of refraction in the range of 1.40 to 1.46;

applying the second polymerized, titanium-containing solution to the coated substrate, wherein a prescribed amount of the solution adheres to the coated substrate;

wherein the first, second, third and fourth layers cooperate to form an antireflection coating that provides substantially reduced reflectivity of visible light.

40. A process as defined in claim 39, wherein:

the first layer has a thickness in the range of 10 to 30 nanometers;

the second layer has a thickness in the range of 20 to 40 nanometers;

the third layer has a thickness in the range of 70 to 100 nanometers; and the fourth layer has a thickness in the range of 80 to 110 nanometers.

41. A process for depositing a polymerized titanium dioxide, thin-film optical coating on a plastic substrate, comprising:

providing a polymerized, non-organic, titanium-containing solution consisting essentially of a titanium alkoxide, an alcohol, and water;

applying the titanium-containing solution to the plastic substrate such that a prescribed amount of the solution adheres to the substrate, wherein applying occurs within a coating chamber in which the relative humidity is at least 40%; and curing the adhered titanium-containing solution to form a polymerized titanium dioxide, thin-film optical coating on the substrate.

42. A process as defined in claim 41, wherein the titanium-containing solution is prepared by mixing the following:

a titanium alkoxide selected from the group consisting of titanium isopropoxide, titanium propoxide, and titanium ethoxide;

ethyl alcohol;

deionized water; and an acidic catalyst selected from the group consisting of hydrochloric acid and nitric acid.

43. A process as defined in claim 41, wherein providing includes filtering the titanium-containing solution through a filter having openings no larger than 5 microns in size.

44. A process as defined in claim 41, wherein curing occurs at an elevated temperature for at least 10 minutes, the elevated temperature being less than the deformation temperature of the plastic substrate.

45. A process for depositing a polymerized silicon dioxide, thin-film optical coating on a plastic substrate, comprising:

providing a polymerized, non-organic, silicon-containing solution consisting essentially of a silicon alkoxide, an alcohol, and water;

applying the silicon-containing solution to the plastic substrate such that a prescribed amount of the solution adheres to the substrate, wherein applying occurs within a coating chamber in which the relative humidity is less than 40%; and curing the adhered silicon-containing solution to from a polymerized silicon dioxide, thin-film optical coating on the substrate.

46. A process as defined in claim 45, wherein the silicon-containing solution is prepared by mixing the following:

a silicon alkoxide selected from the group consisting of tetraethyl orthosilicate and tetramethyl orthosilicate;

ethyl alcohol;

deionized water; and an acidic catalyst selected from the group consisting of hydrochloric acid and nitric acid.

47. A process as defined in claim 45, wherein providing includes filtering the silicon-containing solution through a filter having openings no larger than 5 microns in size.

48. A process as defined in claim 45, wherein curing occurs at an elevated temperature for at least 10 minutes, the elevated temperature being less than the deformation temperature of the plastic substrate.

* * * * *

UNITED STATES PATENT AND TRADEMARK OFFICE
CERTIFICATE OF CORRECTION

PATENT NO. : 5,856,018

DATED : January 5, 1999

INVENTOR(S) : Din-Guo Chen et al.

It is certified that error appears in the above-identified patent and that said Letters Patent is hereby corrected as shown below:

Title Page, under References Cited, please add the following:

U.S. PATENT DOCUMENTS

| | | | | |
|---|---|---|---|---|
| 2,466,119 | 04/05/49 | Moulton et al. | | |
| 4,361,598 | 11/30/82 | Yoldas | 427 | 74 |
| 4,397,666 | 08/09/83 | Mishima et al. | 65 | 18.3 |
| 4,929,278 | 05/29/90 | Ashley et al. | 106 | 287.12 |
| 5,023,208 | 06/11/91 | Pope et al. | 501 | 12 |
| 4,590,117 | 05/20/86 | Taniguchi et al. | 428 | 212 |
| 4,830,879 | 05/16/89 | Debsikdar | 427 | 162 |
| 5,332,618 | 07/26/94 | Austin | 428 | 216 |

FOREIGN PATENT DOCUMENTS

| | | | | |
|---|---|---|---|---|
| 0 185 189 | 08.11.85 | Europe | G02B | 5/28 |
| 0 661 558 | 05.07.95 | Europe | | |

Signed and Sealed this

Sixteenth Day of May, 2000

Attest:

Q. TODD DICKINSON

*Attesting Officer*        *Director of Patents and Trademarks*

UNITED STATES PATENT AND TRADEMARK OFFICE
CERTIFICATE OF CORRECTION

PATENT NO. : 5,856,018
DATED : January 5, 1999
INVENTOR(S) : Din-Guo Chen et al.

It is certified that error appears in the above-identified patent and that said Letters Patent is hereby corrected as shown below:

On the cover page, under Related U.S. Application Data, at Section [63], please delete "Continuation of Ser. No. 618,915, Mar. 20, 1996, abandoned."

At column 1, line 6, please delete "This application is a continuation of application Ser. No. 08/618,915 filed Mar. 20, 1996 now abandoned."

Signed and Sealed this

Seventeenth Day of October, 2000

Attest:

Q. TODD DICKINSON

*Attesting Officer*     *Director of Patents and Trademarks*

UNITED STATES PATENT AND TRADEMARK OFFICE
CERTIFICATE OF CORRECTION

PATENT NO. : 5,856,018
DATED : January 5, 1999
INVENTOR(S) : Din-Guo Chen et al.

It is certified that error appears in the above-identified patent and that said Letters Patent is hereby corrected as shown below:

On the cover page, under Related U.S. Application Data, at Item [63], please delete "Continuation of Ser. No. 618,915, Mar. 20, 1996, abandoned."

At column 1, line 6, please delete "This application is a continuation of application Ser. No. 08/618,915 filed Mar. 20, 1996 now abandoned."

Signed and Sealed this

Thirtieth Day of January, 2001

Attest:

Q. TODD DICKINSON

*Attesting Officer*   *Director of Patents and Trademarks*